US012138761B2

(12) United States Patent
Zanni

(10) Patent No.: US 12,138,761 B2
(45) Date of Patent: Nov. 12, 2024

(54) APPARATUS FOR CLAMPING WORKPIECES ON MACHINE TOOLS

(71) Applicant: Hydroblock S.r.l., Reggio Emilia (IT)

(72) Inventor: Davide Zanni, Reggio Emilia (IT)

(73) Assignee: Hydroblock S.r.l., Reggio Emilia (IT)

( * ) Notice: Subject to any disclaimer, the term of this patent is extended or adjusted under 35 U.S.C. 154(b) by 85 days.

(21) Appl. No.: 17/915,528

(22) PCT Filed: Mar. 29, 2021

(86) PCT No.: PCT/IB2021/052570
§ 371 (c)(1),
(2) Date: Sep. 29, 2022

(87) PCT Pub. No.: WO2021/198875
PCT Pub. Date: Oct. 7, 2021

(65) Prior Publication Data

US 2023/0138486 A1 May 4, 2023

(30) Foreign Application Priority Data

Mar. 31, 2020 (IT) ........................ 102020000006721

(51) Int. Cl.
*B25B 5/06* (2006.01)
*B25B 5/16* (2006.01)

(52) U.S. Cl.
CPC .............. *B25B 5/064* (2013.01); *B25B 5/163* (2013.01)

(58) Field of Classification Search
CPC . B23Q 3/06; B23Q 3/082; B23Q 3/10; B23Q 3/106; B23Q 3/107; B23Q 3/108;
(Continued)

(56) References Cited

U.S. PATENT DOCUMENTS

2015/0285280 A1* 10/2015 Kawakami .......... F15B 15/2807 91/418
2015/0345521 A1* 12/2015 Yokota ................ F15B 15/2807 91/435

(Continued)

FOREIGN PATENT DOCUMENTS

DE 29811901 10/1998
EP 2949950 12/2015

OTHER PUBLICATIONS

International Search Report and the Written Opinion Dated Jul. 14, 2021 From the International Searching Authority Re. Application No. PCT/IB2021/052570.(8 Pages).

*Primary Examiner* — Tyrone V Hall, Jr.
*Assistant Examiner* — Alberto Saenz

(57) ABSTRACT

The apparatus (1) for clamping workpieces on machine tools comprises:

- a basic frame (2) fixable to a machine tool (M) for machining a workpiece (P);
- a clamping unit (3);
- a hydraulic actuator (22, 23) comprising a first chamber (26) which can be supplied with a first pressurized hydraulic fluid and is connectable to a first sensing device (27) for sensing the pressure of the first hydraulic fluid;
- a sensing channel (15) which can be supplied with pressurized air and which is connectable to a sensing sensor (16) for sensing the pressure of the air;

wherein the first sensing device (27) and the sensing sensor (16) are connectable to a control system adapted to authorize the machining of the workpiece (P) when the pressure of the first hydraulic fluid and the pressure of the air are simultaneously higher than their respective threshold values.

10 Claims, 7 Drawing Sheets

(58) Field of Classification Search
CPC ......... B25B 5/006; B25B 5/012; B25B 5/061; B25B 5/064; B25B 5/087; B25B 5/163; Y10T 279/1249
USPC ............. 269/20, 24, 25, 27, 32, 228; 29/559
See application file for complete search history.

(56) References Cited

U.S. PATENT DOCUMENTS

| | | | | |
|---|---|---|---|---|
| 2017/0339515 | A1* | 11/2017 | Masakawa | B23Q 3/06 |
| 2018/0051723 | A1* | 2/2018 | Kojima | B23Q 3/069 |

* cited by examiner

APPARATUS FOR CLAMPING WORKPIECES ON MACHINE TOOLS

RELATED APPLICATIONS

This application is a National Phase of PCT Patent Application No. PCT/IB2021/052570 having International filing date of Mar. 29, 2021, which claims the benefit of priority of Italy Patent Application No. 102020000006721 filed on Mar. 31, 2020. The contents of the above applications are all incorporated by reference as if fully set forth herein in their entirety.

FIELD AND BACKGROUND OF THE INVENTION

The present invention relates to an apparatus for clamping workpieces on machine tools.

As is well known, in the large-scale production of mechanical workpieces that require machining on the machine tool, the use of systems with a high level of automation is widespread wherein an anthropomorphic robot brings the workpieces to be machined to a machine tool, where special apparatuses of the hydraulic type, take over the workpiece and clamp it in position to allow the machining thereof.

When the machining process is completed, the aforementioned means release the machined workpiece, which is moved away once again by means of the robot.

The clamping apparatuses must be capable of exerting even very high clamping forces on the workpiece being machined.

This need is particularly felt, e.g., in the automotive sector, wherein the continuous need to optimize the production cycles has led to the use of tools that operate at very high speeds, unloading very strong forces and vibrations on the workpiece that must be offset by the fastening systems.

Still in the automotive sector, moreover, the use of particularly light materials such as aluminum is becoming more and more widespread but, during machining, they are not able to ensure the same resistance as materials such as e.g. cast iron and steel.

It is therefore necessary that the clamping apparatuses, in addition to exerting a very high force, rest on the workpiece at predetermined points, with a great precision and in a repeatable manner every time a new workpiece to be machined is mounted on the machine tool; otherwise, in fact, the high force exerted by the clamping apparatus may cause the deformation of the workpieces, which compromises the quality of the machining and the risk of obtaining workpieces that are out of tolerance.

In such automated systems, the level of operational reliability of the individual components, including the apparatuses for clamping the workpieces, is usually very high.

Nevertheless, it sometimes happens that the mechanical workpieces to be machined are not placed correctly and precisely, so the clamping apparatuses fail to clamp the workpiece perfectly (or do so but in the wrong position), thus risking to jeopardize the entire machining process and to damage the workpiece and/or the machining tools and/or the clamping apparatuses.

Similar problems can also occur when unloading the workpiece at the end of the machining process; in fact, if the clamping apparatuses do not completely and correctly release the machined workpiece, in fact, the workpiece movement robot picks (or tries to pick) a workpiece which is not perfectly released, with the risk of seriously damaging the workpiece and/or the clamping apparatuses and/or the robot itself.

In this context, it is important to underline that, in highly automated systems, any malfunction that causes the stoppage of the processing can easily turn into a lack of production or, even worse, into a damage of the systems, and into a consequent economic damage of non-negligible entity.

SUMMARY OF THE INVENTION

The main aim of the present invention is to devise an apparatus for clamping workpieces on machine tools which allows preventing machining operations from being performed on workpieces that are not properly placed and clamped on the machine tool.

A further object of the present invention is to devise an apparatus for clamping workpieces on machine tools which allows preventing the machined workpieces from unloading that are not perfectly and properly released.

Last but not least, the object of the present invention is to devise an apparatus for clamping workpieces on machine tools with high reliability and precision of operation.

Still another object of the present invention is to devise an apparatus for clamping workpieces on machine tools which allows avoiding unwanted malfunctions and damage to the workpiece being machined and/or to the tools of the machine tool and/or to the workpiece movement robot and/or to the clamping apparatus thereof.

Another object of the present invention is to devise an apparatus for clamping workpieces on machine tools which allows overcoming the aforementioned drawbacks of the prior art within the scope of a simple, rational, easy, effective to use and affordable solution.

The objects set out above are achieved by the present apparatus for clamping workpieces on machine tools having the characteristics of claim 1.

BRIEF DESCRIPTION OF THE SEVERAL VIEWS OF THE DRAWINGS

Other characteristics and advantages of the present invention will become more evident from the description of some preferred, but not exclusive, embodiments of an apparatus for clamping workpieces on machine tools, illustrated by way of an indicative, yet non-limiting example, in the accompanying tables of drawings wherein.

DESCRIPTION OF SPECIFIC EMBODIMENTS OF THE INVENTION

Figure 1:
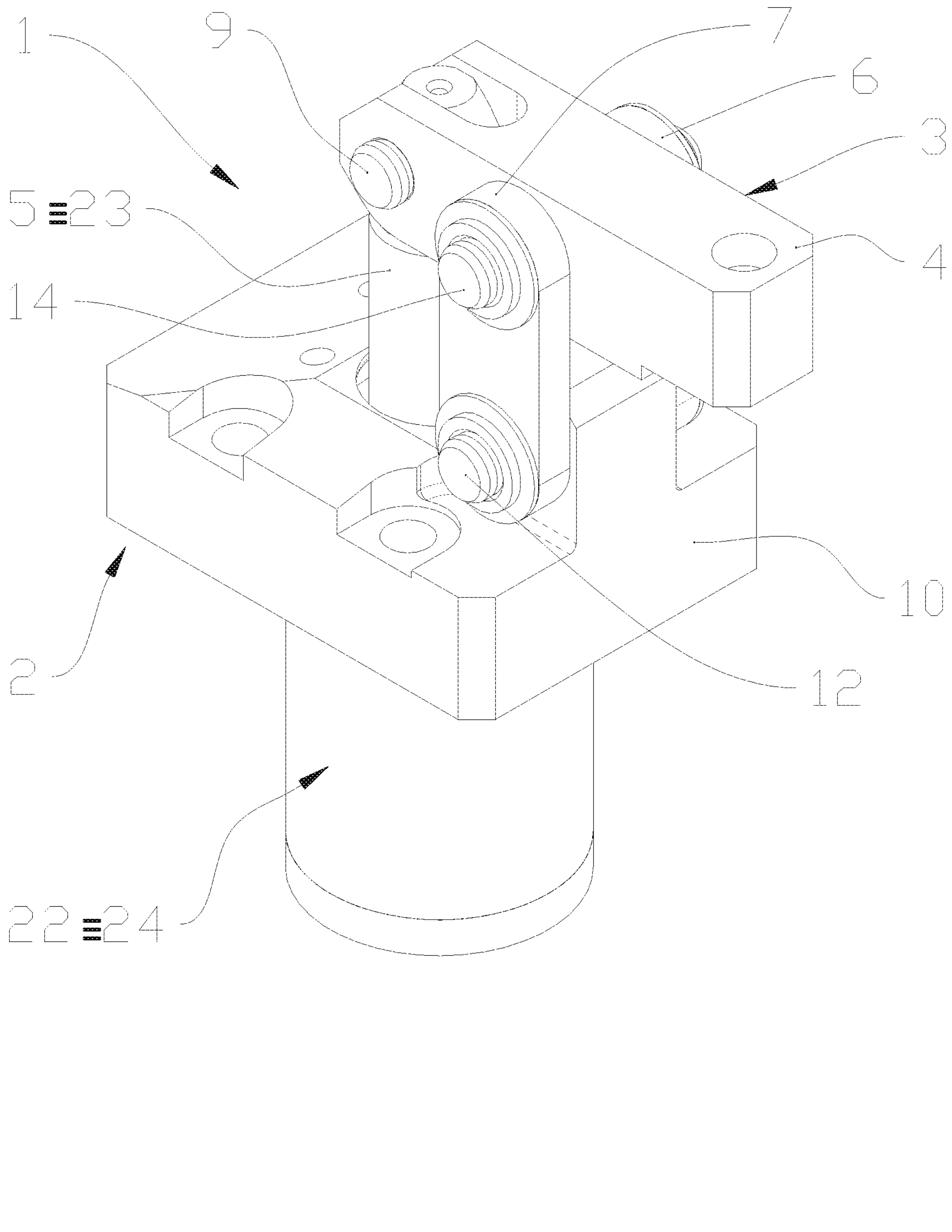
FIG. 1 is an axonometric view of a first embodiment of the apparatus according to the invention.
Figure 2:
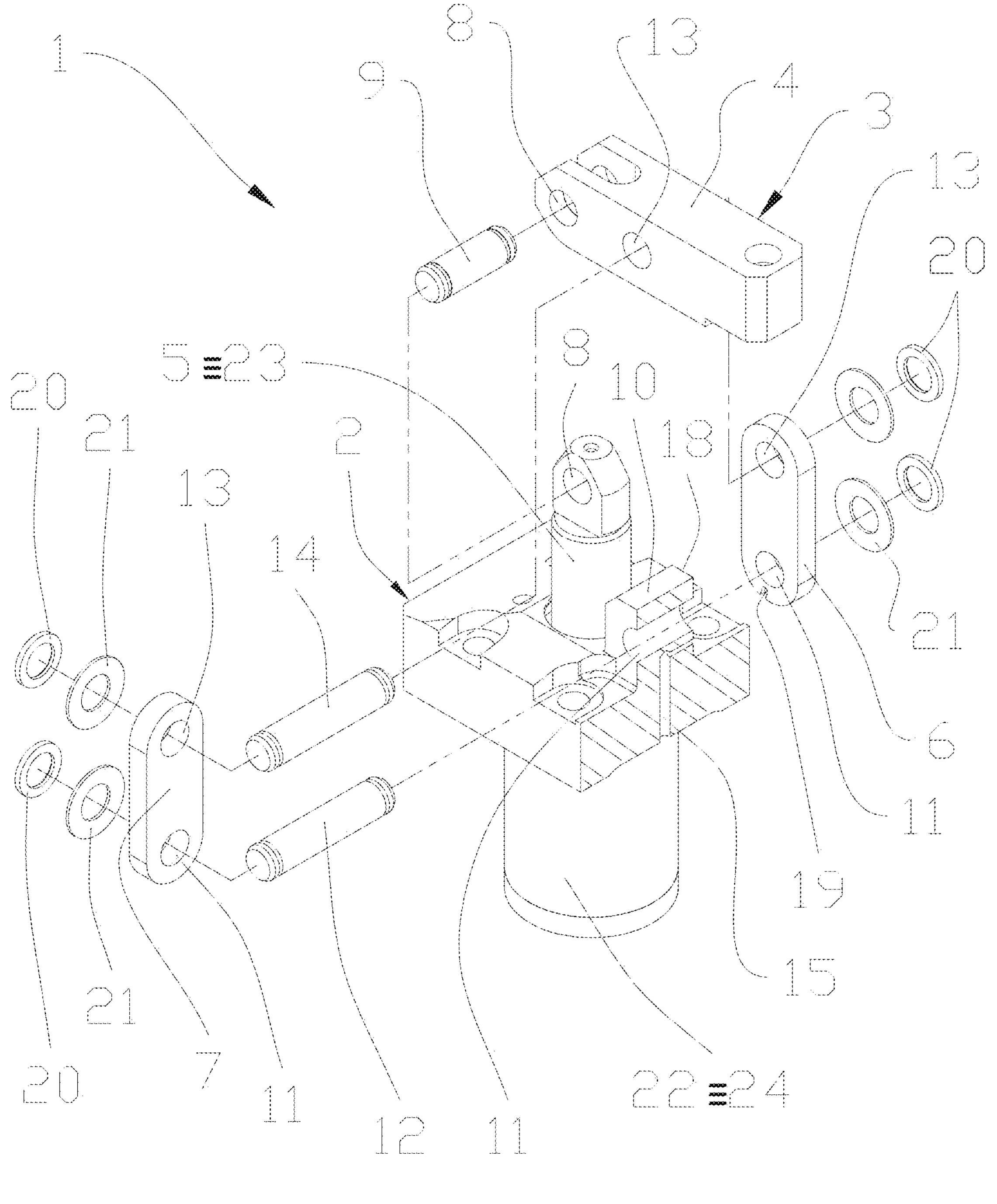
FIG. 2 is an exploded view of the apparatus in FIG. 1.

With particular reference to the embodiment shown in FIGS. 1 to 5, reference numeral 1 globally indicates an apparatus for clamping workpieces on machine tools.

The apparatus 1, in particular, is intended to clamp a workpiece P after it has been placed on a worktop L of a machine tool M and before mechanical machining has started.

Preferably, the machine tool M is of the highly automated type, wherein an anthropomorphic robot is dedicated to load the workpieces P to be machined and unload the machined workpieces P.

It should be noted that the machine tool M is provided with a plurality of apparatuses 1, which are arranged at adequate positions and in appropriate amounts based on the shape of the workpiece P and on the type of mechanical machining that is to be performed.

In the figures and in the remainder of the present disclosure, reference will be made for simplicity's sake to a single apparatus 1, unless otherwise indicated. The apparatus 1 comprises at least one basic frame 2 that is fixable to the machine tool M, e.g. to its worktop L, to its bedplate or to any other part thereof.

The apparatus 1 comprises at least one clamping unit 3 associated with the basic frame 2 in a movable manner between a release position and a clamping position of the workpiece P, passing through a plurality of intermediate transient positions.

Conveniently, the clamping unit 3 comprises:

at least one bracket element 4 hinged to a movable portion 5 around a first hinging axis A and adapted to come into contact with the workpiece P in the clamping position;

at least one hinging linkage 6, 7 hinged to the basic frame 2 around a second hinging axis B and hinged to the bracket element 4 around a third hinging axis C.

Advantageously, the hinging axes A, B, C are substantially parallel to each other.

By virtue of the shape of the clamping unit 3, in actual facts, in the release position the bracket element 4 is placed in an almost vertical position, which leaves free access to the worktop L for the positioning and the removal of the workpiece P; in the clamping position, on the other hand, the bracket element 4 is positioned in a substantially horizontal position and overhanging on the worktop, so as to clamp the workpiece P between the bracket element 4 and the worktop L.

The hinging between the bracket element 4 and the movable portion 5 around the first hinging axis A is defined by a series of first holes 8, formed on the bracket element 4 and on the movable portion 5, and by a first pin 9, inserted into the first holes 8 aligned with each other.

For example, the hinging linkage 6, 7 comprises a first connecting rod 6 and a second connecting rod 7, both hinged around the second and third hinging axes B, C.

Conveniently, the connecting rods 6, 7 are arranged on symmetrically opposite sides of both the bracket element 4 and of a hinging portion 10 of the basic frame 2.

The hinging between the connecting rods 6, 7 and the basic frame 2 around the second hinging axis B is defined by a series of second holes 11, formed on the connecting rods 6, 7 and on the hinging portion 10, and by a second pin 12, inserted into the second holes 11 aligned with each other.

The hinging between the connecting rods 6, 7 and the bracket element 4 around the third hinging axis C, on the other hand, is defined by a series of third holes 13, formed on the connecting rods 6, 7 and on the bracket element 4, and by a third pin 14, inserted into the third holes 13 aligned with each other.

The apparatus 1 comprises at least one sensing channel 15 formed on at least one of either the basic frame 2 or the clamping unit 3.

The sensing channel 15 can be supplied with pressurized air and can be connected to a sensing sensor 16 which is adapted to sense the pressure of the pressurized air.

More in detail, the sensing channel 15 is connected to a first pneumatic circuit 17 adapted to supply the pressurized air.

The first pneumatic circuit 17 is provided with the sensing sensor 16 (such as a pressure switch), by means of which the air pressure inside the sensing channel 15 can be known.

The sensing channel 15 is hermetically sealed when the clamping unit 3 is in the clamping position and is open outwards at least when the clamping unit 3 is in the intermediate transient positions.

Therefore, when the clamping unit 3 is in the clamping position, the air supplied under pressure into the sensing channel 15 remains trapped in the sensing channel itself and its pressure tends to increase; in the intermediate transient positions, however, the air is allowed to vent outwards and its pressure tends to decrease.

Conveniently, the sensing channel 15 is formed on the basic frame 2 and the hinging linkage 6, 7 is shaped so as to open and close the sensing channel 15 based on the position of the hinging linkage 6, 7.

More specifically, the sensing channel 15 emerges on a first surface 18 of the basic frame 2 which, e.g., is formed on the hinging portion 10.

The first connecting rod 6 rests in rotation on the first surface 18 and comprises a first venting recess 19.

With the first connecting rod 6 are associated first preloading means 20, 21 adapted to keep the first connecting rod 6 in sealed contact on the first surface 18 and to keep the sensing channel 15 normally closed.

The first preloading means 20, 21 consist, e.g., of a set of cup springs 20 and washers 21 mounted on the second pin 12 and on the third pin 14 and operating so as to push the connecting rods 6, 7 against the hinging portion 10 and against the bracket element 4.

This way, on the one hand, it is ensured that the existing clearances between the basic frame 2, the connecting rods 6, 7 and the bracket element 4 are reset, so as to achieve a more stable and precise assembly operation, and on the other hand the sealed closure of the sensing channel 15 is achieved even without the presence of rubber seals or other soft material.

The opening of the sensing channel 15, in actual facts, only takes place when the first venting recess 19 overlaps at least partly the sensing channel 15 which occurs, as mentioned, when the clamping unit 3 moves to the intermediate transient positions.

As described and shown, the sensing channel 15 is formed on the basic frame 2 and the hinging linkage 6, 7 is shaped so as to open and close the sensing channel 15; alternative embodiments cannot however be ruled out wherein the sensing channel 15 is differently arranged and its opening and closure are achieved by means of components other than the hinging linkage 6, 7.

For the movement of the clamping unit between the release position and the clamping position, the apparatus 1 comprises at least one hydraulic actuator 22, 23, provided with a fixed portion 24, associated with the basic frame 2, and a movable portion 5, connected to the clamping unit 3.

The movable portion 5 of the hydraulic actuator 22, 23 conveniently coincides with the movable portion to which the bracket element 4 is hinged around the first hinging axis A.

For example, the hydraulic actuator 22, 23 comprises a cylinder 22, defining the fixed portion 24, and a stem 23, which is provided with a plunger 25, comes out of the cylinder 22 and defines the movable portion 5.

The cylinder 22 of the hydraulic actuator 22, 23 is formed in a single body piece with the basic frame 2.

Inside the cylinder, the hydraulic actuator 22, 23 comprises at least a first chamber 26 which can be supplied with a first pressurized hydraulic fluid to displace the clamping unit 3 from the release position to the clamping position.

Within the present disclosure, by hydraulic fluid is meant any fluid in the liquid state (and therefore ideally incompressible) used as a carrier for the transport of energy in a hydraulic circuit; preferably the hydraulic fluid consists of a traditional synthetic oil but alternative embodiments cannot however be ruled out wherein it may be mineral oil, vegetable oil, water or the like.

The first chamber 26 operates on one side of the plunger 25.

The first chamber 26 is connectable to a first sensing device 27 for sensing the pressure of the first pressurized hydraulic fluid.

More in detail, the first chamber 26 is connected to a first duct 28, formed in the cylinder of the hydraulic actuator 22, 23, in turn connected to a first hydraulic circuit 29 adapted to supply the first hydraulic fluid.

The first hydraulic circuit 29 is provided with the first sensing device 27 (e.g., a pressure switch), by means of which the pressure of the first pressurized hydraulic fluid inside the first chamber 26 can be known.

The first sensing device 27 and the sensing sensor 16 are connectable to a control system adapted to authorize the machining of the workpiece P when the pressure of the first hydraulic fluid under pressure in the first chamber 26 and the pressure of the air in the sensing channel 15 are simultaneously higher than their respective threshold values.

The control system, for example as shown by reference number 222 in the figures, consists, e.g., of a control unit (electronic, hydraulic or a combination of both) that manages the operation of the machine tool M.

In actual facts, in order to consent to the start of the mechanical machining on the workpiece P, the control system carries out a double check:

- it checks whether the first chamber 26 is pressurized, i.e., it is supplied with the first pressurized hydraulic fluid; and
- it checks whether the sensing channel 15 is pressurized, i.e. it is closed and air cannot vent outwards.

Figure 3:
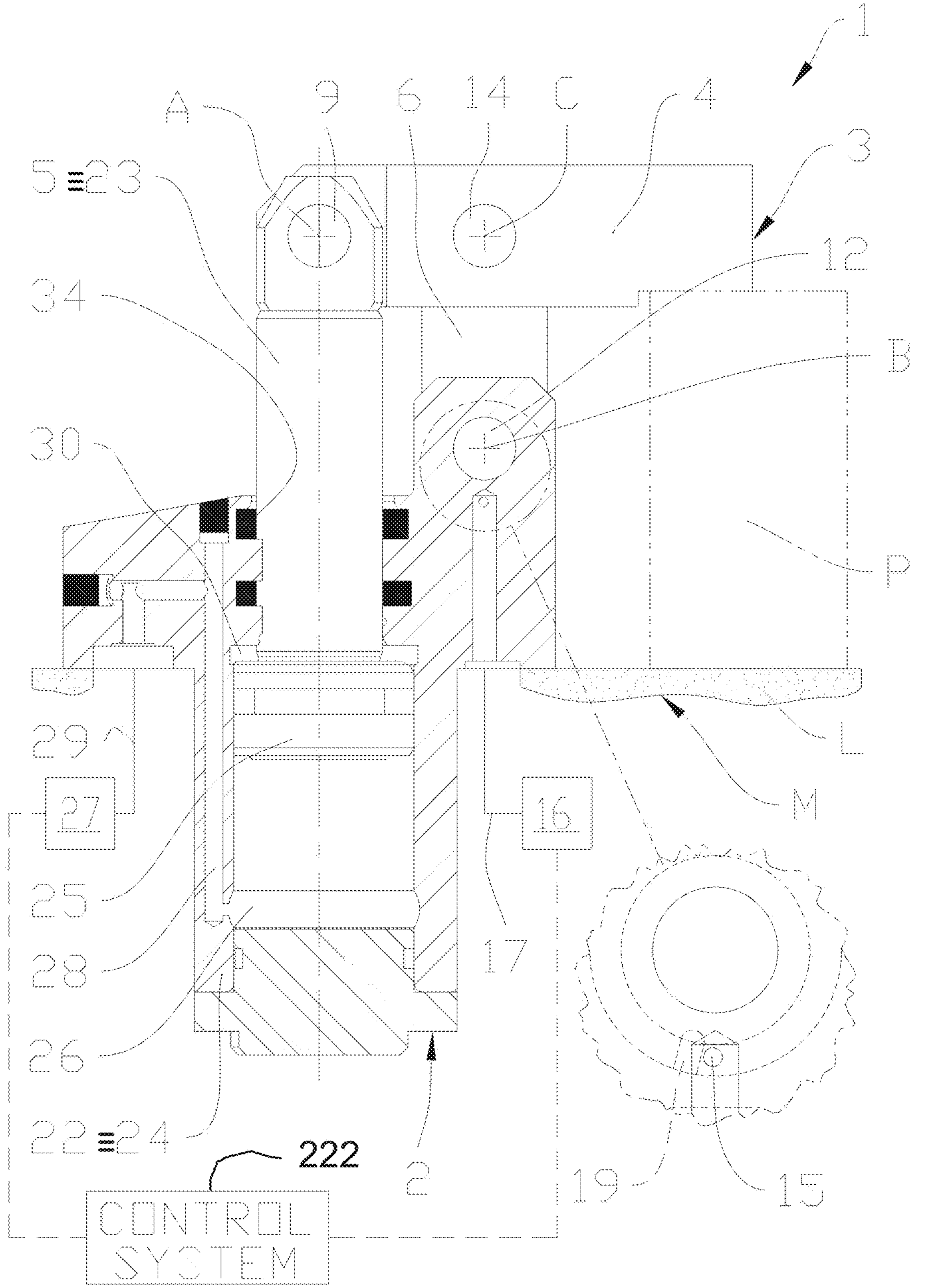
FIG. 3 is a cross-sectional view of the apparatus in FIG. 1 in the clamping position.

If both of these circumstances occur at the same time, then the control system senses that the clamping unit is correctly arranged in the clamping position and consents to the tools of the machine tool M to carry out the machining operations; such a circumstance is shown in FIG. 3.

Figure 4:
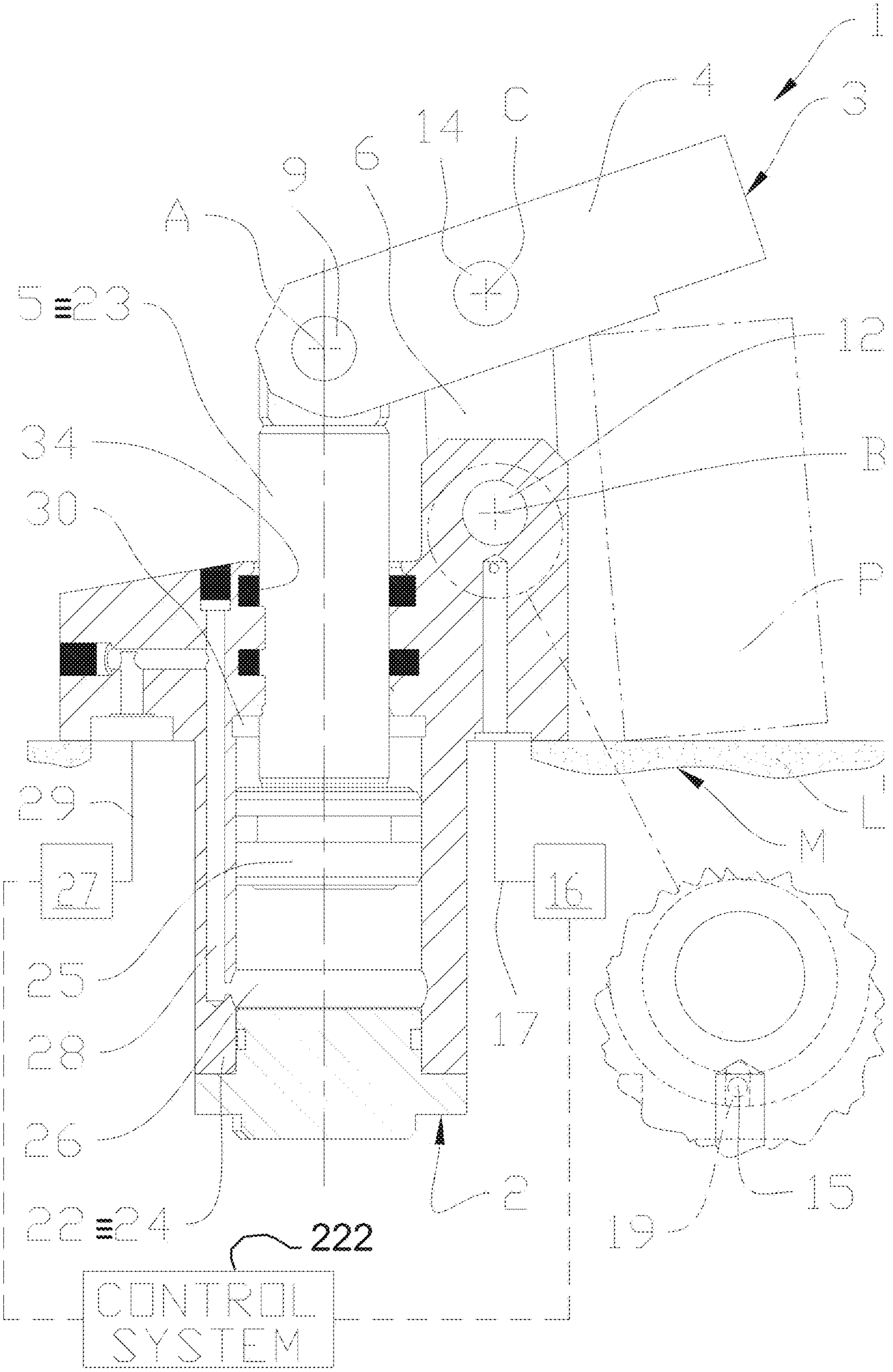
FIG. 4 is a cross-sectional view of the apparatus in FIG. 1 in an intermediate transient position.

FIG. 4, on the other hand, shows a situation wherein the workpiece P has been placed on the machine tool M in a wrong position, and the bracket element 4 fails to reach the clamping position because it gets in contact with the workpiece P when the clamping unit 3 is still in one of the intermediate transient positions. Under this circumstance, the first hydraulic fluid in the first chamber 26 is pressurized and the first sensing device 27 senses this pressure; the first venting recess 19, on the other hand, is however at least partly overlapped to the sensing channel 15, the pressurized air vents outwards and the sensing sensor 16 senses that the pressure in the sensing channel 15 is not higher than the threshold value. Under this circumstance, therefore, the control system learns that the clamping unit 3 has not reached the clamping position and does not authorize the start of the mechanical machining operations.

The lack of authorization safeguards the workpiece P and the machine tool M by preventing operations that are potentially dangerous for their integrity from being carried out.

In response to the lack of authorization, protocols aimed at restoring normal working conditions may be activated, such as e.g. the repositioning of the workpiece P and/or the intervention of an operator.

In the embodiment shown in FIGS. 1-5, the hydraulic actuator is of the double acting type and comprises at least a second chamber 30 which can be supplied with a second pressurized hydraulic fluid to displace the clamping unit 3 from the clamping position to the release position.

Preferably, the second hydraulic fluid is identical to the first hydraulic fluid used as a carrier to set the first chamber 26 under pressure; in other words, the same hydraulic fluid may be pumped into the first chamber 26 and into the second chamber 30 as required.

Alternative embodiments wherein two different hydraulic fluids are used cannot, however, be ruled out.

The second chamber 30 operates on one side of the plunger 25 opposite the first chamber 26.

The second chamber 30 is connectable to a second sensing device 31 of the pressure of the second pressurized hydraulic fluid.

More in detail, the second chamber 30 is connected to a second duct 32, formed in the cylinder of the hydraulic actuator 22, 23, in turn connected to a second hydraulic circuit 33 adapted to supply the second hydraulic fluid.

The second hydraulic circuit 33 is provided with the second sensing device 31 (such as e.g. a pressure switch) by means of which the pressure of the second pressurized hydraulic fluid inside the second chamber 30 can be known.

Advantageously, the sensing channel 15 is hermetically closed when the clamping unit is in the release position, and the second sensing device 31 and the sensing sensor 16 are connectable to a control system adapted to authorize the picking of the workpiece P from the machine tool M when the pressure of the second hydraulic fluid in the second chamber 30 and the pressure of air in the sensing channel 15 are simultaneously higher than their respective threshold values.

The control system intended to authorize the picking of the workpiece P may conveniently coincide with the control system intended to authorize the machining of the workpiece P and consist, e.g., of the control unit that manages the operation of the machine tool M.

In actual facts, in order to consent to the picking of the workpiece P, after the machining operations have been completed, the control system carries out a double check:

- it checks whether the second chamber 30 is pressurized, i.e., it is supplied with the second pressurized hydraulic fluid; and
- it checks whether the sensing channel 15 is pressurized, i.e. it is closed and air cannot vent outwards.

Figure 5:
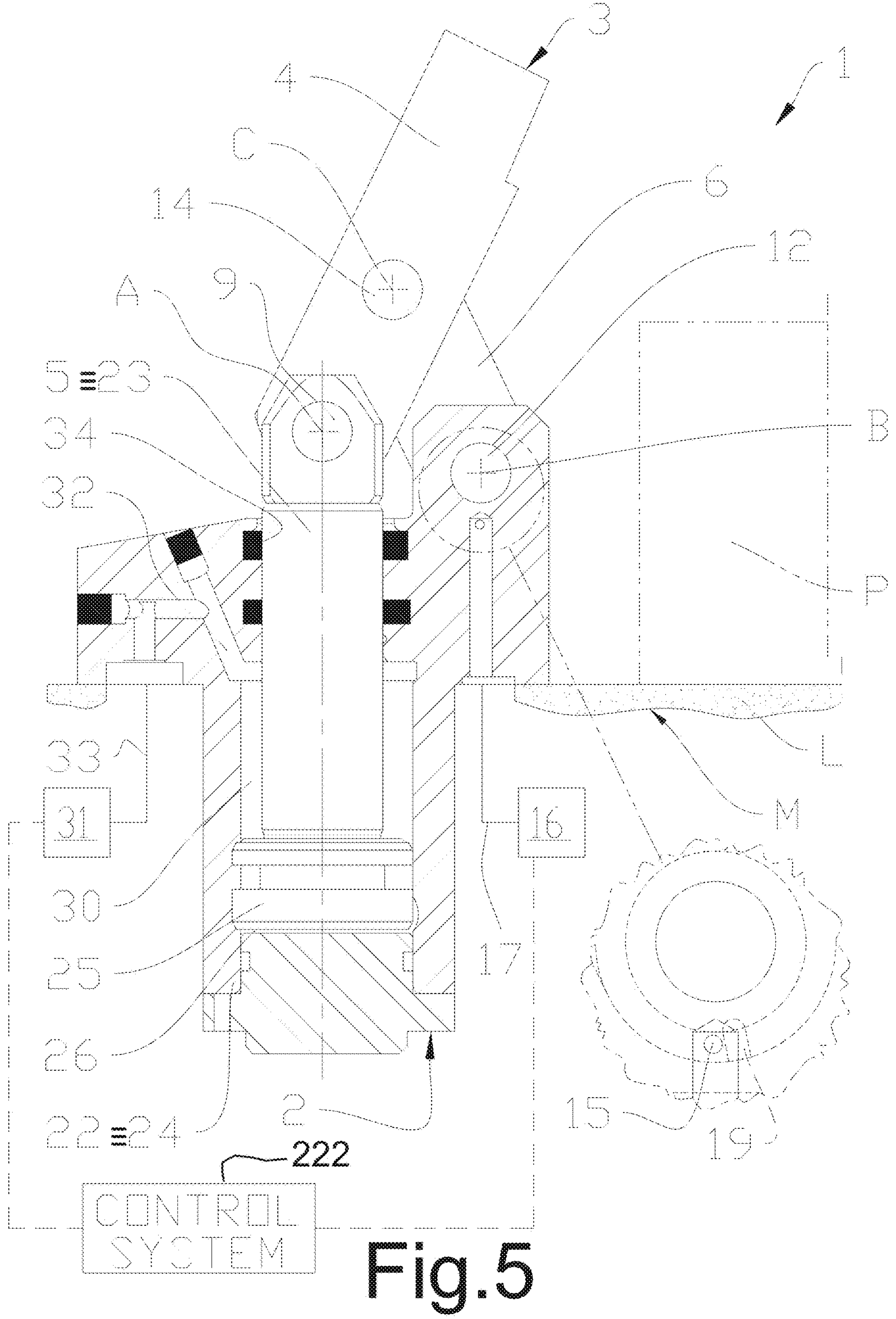
FIG. 5 is a cross-sectional view of the apparatus in FIG. 1 in the release position.

If both these circumstances occur at the same time, then the control system senses that the clamping unit is correctly arranged in the release position and allows the movement robot of the workpiece P to pick it from the machine tool M; such a circumstance is shown in FIG. 5.

The apparatus 1, as described and shown in FIGS. 1 to 5, has several workpieces in contact with the pressurized hydraulic fluid and, therefore, special seals are arranged at various points of the apparatus 1 which, for simplicity of representation, have been commonly identified with reference numeral 34.

Figure 6:
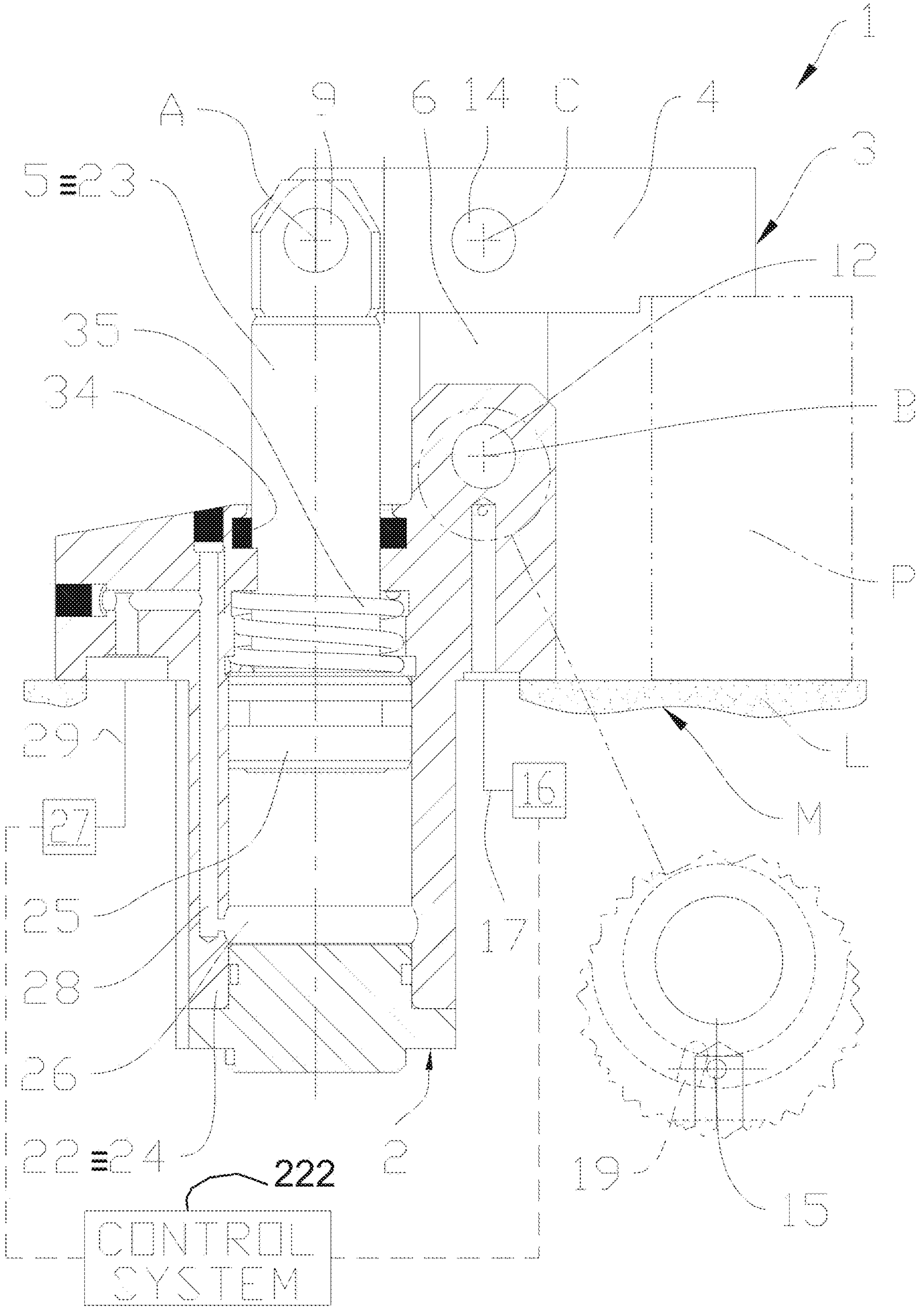
FIG. 6 is a cross-sectional view of a second embodiment of the apparatus according to the invention.

FIG. 6 shows a second embodiment of the present invention wherein the apparatus 1 is identical to the embodiment of FIGS. 1 to 5 except for the fact that the hydraulic actuator 22, 23 is of the single acting type and comprises at least one springback element 35 to displace the clamping unit 3 from the clamping position to the release position.

The springback element 35 consists, e.g., of a helical spring operating on the plunger 25 on the opposite side with respect to the first chamber 26.

In this embodiment, the apparatus 1 is provided with the first chamber 26, which is connected to the first sensing device 27, but is not provided with the second chamber 30 and with the second sensing device 31.

By means of the apparatus 1 in FIG. 6, therefore, it is not possible to identify with certainty the achievement of the release position by means of the clamping unit 3 as is the case in the embodiment of FIGS. 1 to 5, but it is still possible to identify with certainty the achievement of the clamping position and the start of the mechanical machining operations when it is checked that the pressure of the first hydraulic fluid in the first chamber 26 and the air pressure in the sensing channel 15 are simultaneously higher than their respective threshold values.

Figure 7:
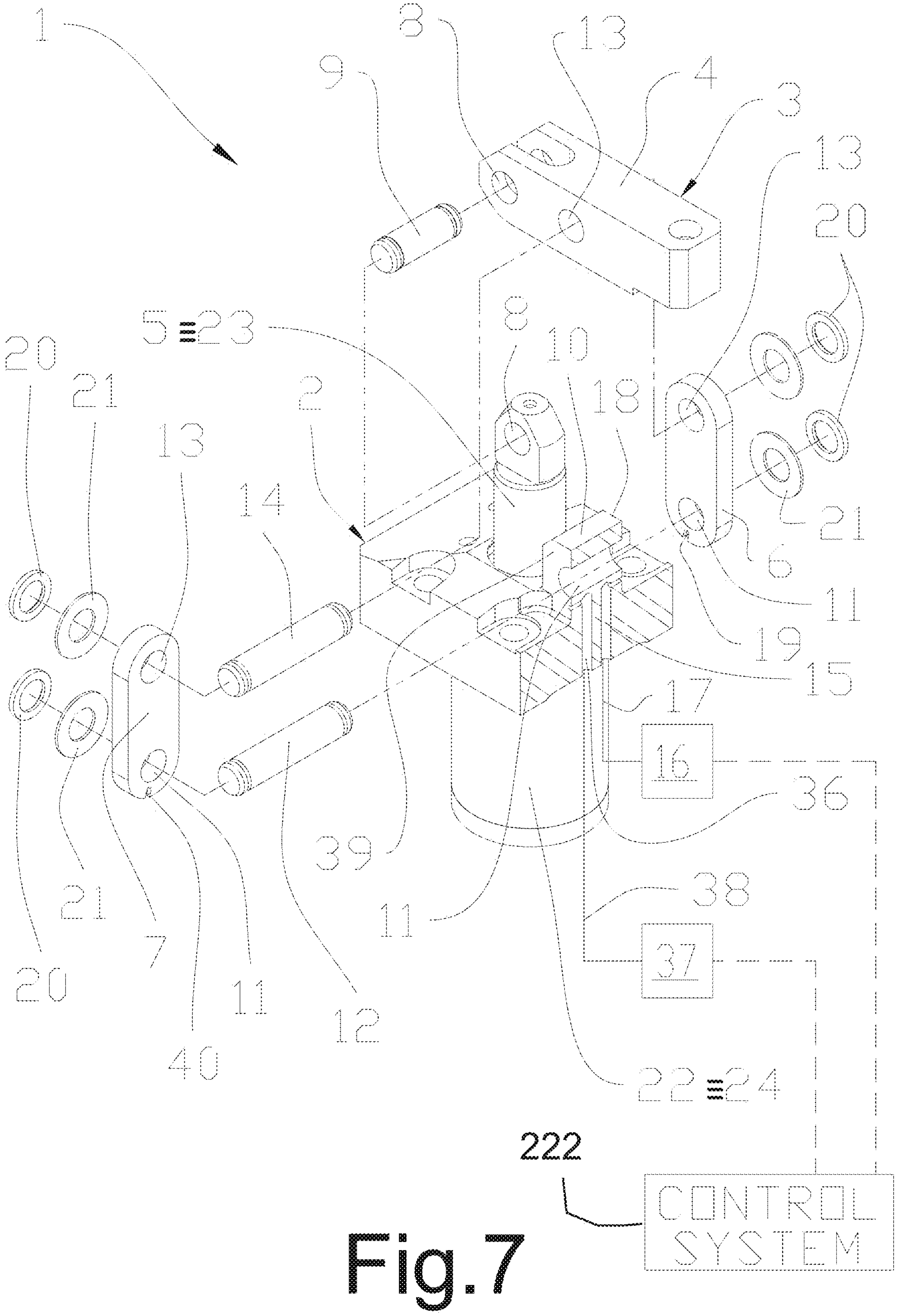
FIG. 7 is an exploded view of a third embodiment of the apparatus according to the invention.

A third embodiment of the invention is shown in FIG. 7, wherein the hydraulic actuator 22, 23 is still of the single acting type and is provided with the springback element 35 that allows the clamping unit 3 to be displaced from the clamping position to the release position.

Unlike the embodiment in FIG. 6, however, the apparatus 1 comprises at least one auxiliary channel 36 located on at least one of either the basic frame 2 or the clamping unit 3.

The auxiliary channel 36 can be supplied with pressurized air and can be connected to an auxiliary sensor 37 adapted to sense the pressure of the pressurized air.

More in detail, the auxiliary channel 36 is connected to a second pneumatic circuit 38 adapted to supply air under pressure.

The second pneumatic circuit 38 is provided with the auxiliary sensor 37 (such as e.g. a pressure switch), by means of which the air pressure inside the auxiliary channel 36 can be known.

The auxiliary channel 36 is hermetically sealed when the clamping unit 3 is in the release position and is open outwards at least when the clamping unit 3 is in the intermediate transient positions.

Therefore, when the clamping unit 3 is in the release position, the air supplied under pressure into the auxiliary channel 36 remains trapped in the sensing channel itself and its pressure tends to increase; in the intermediate transient positions, however, the air is allowed to vent outwards and its pressure tends to decrease.

Conveniently, the auxiliary channel 36 is formed on the basic frame 2 and the hinging linkage 6, 7 is shaped to open and close the auxiliary channel 36 based on the position of the hinging linkage 6, 7.

In more detail, the auxiliary channel 36 emerges on a second surface 39 of the basic frame 2 which is formed on the hinging portion 10, on the opposite sides with respect to the first surface 18.

The second connecting rod 7 rests in rotation on the second surface 39 and comprises a second venting recess 40.

Second preloading means are associated with the second connecting rod 7 and are adapted to keep the second connecting rod 7 in sealed contact on the second surface 39 and to keep the auxiliary channel 36 normally closed.

The second preloading means usefully coincide with the first preloading means 20, 21.

The cup springs 20 and the washers 21, in fact, operate so as to push both the connecting rods 6, 7 against the hinging portion 10 and against the bracket element 4.

The opening of the auxiliary channel 36, in actual facts, takes place only when the second venting recess 40 overlaps at least partly the auxiliary channel 36, which occurs, as mentioned above, when the clamping unit 3 moves to the intermediate transient positions.

In the embodiment shown in FIG. 7, the first sensing device 27 and the auxiliary sensor 37 are connectable to a control system adapted to authorize the picking of the workpiece P from the machine tool M when the pressure of the first hydraulic fluid in the first chamber 26 is lower than a respective threshold value and, at the same time, the pressure of the air in the auxiliary channel 36 is higher than a respective threshold value.

Again, the control system intended to authorize the picking of the workpiece P in the embodiment in FIG. 7 may conveniently coincide with the control system intended to authorize the machining of the workpiece P and may consist, for example, of the control unit that manages the operation of the machine tool M.

In actual facts, in order to consent to the picking of the workpiece P after the mechanical machining operations have been completed, the control system carries out a double check:

- it checks whether the first chamber 26 is not pressurized, i.e., not supplied with the first pressurized hydraulic fluid; and
- it checks whether the auxiliary channel 36 is pressurized, i.e., closed and air cannot vent outwards.

If both these circumstances occur at the same time, then the control system senses that the clamping unit 3 is correctly arranged in the release position and allows the movement robot of the workpiece P to pick it from the machine tool M.

The invention claimed is:

1. An apparatus (1) for clamping workpieces on machine tools, comprising:

at least one basic frame (2) fixable to a machine tool (M) for machining a workpiece (P);

at least one clamping unit (3) associated with said basic frame (2) in a movable manner between a release position and a clamping position of said workpiece (P), passing through a plurality of intermediate transient positions;—at least one hydraulic actuator (22, 23), provided with a fixed portion (24), associated with said basic frame (2), and a movable portion (5), connected to said clamping unit (3), said hydraulic actuator (22, 23) comprising at least a first chamber (26) configured to be supplied with a first pressurized hydraulic fluid to displace said clamping unit (3) from said release position to said clamping position, said first chamber (26) being connectable to a first sensing device (27) for sensing the pressure of said first pressurized-hydraulic fluid;

wherein:

said apparatus (1) comprises at least one sensing channel (15) formed on at least one of either said basic frame (2) or said clamping unit (3), configured to be supplied with pressurized air and which is connectable to a sensing sensor (16) for sensing the pressure of said pressurized air, wherein said at least one sensing channel (15) is hermetically sealed when said clamping unit (3) is in the clamping position and is open outwards at least when said clamping unit (3) is in said intermediate transient positions; and said first sensing device (27) and said sensing sensor (16) are connectable to a control system adapted to authorize a machining of said workpiece (P) when a pressure of said first pressurized hydraulic fluid in said first chamber (26) and a pressure of said pressurized air in said at least one sensing channel (15) are simultaneously higher than their respective threshold values.

2. The apparatus (1) according to claim 1, wherein:

said at least one hydraulic actuator (22, 23) is of a double acting hydraulic actuator and comprises at least a second chamber (30) configured to be supplied with a second pressurized hydraulic fluid to displace said clamping unit (3) from said clamping position to said release position, said second chamber (30) being connectable to a second sensing device (31) configured to sense a pressure of said second hydraulic fluid;

said at least one sensing channel (15) is hermetically sealed when said clamping unit (3) is in the clamping position and is open outwards at least when said clamping unit (3) is in the release position; and said second sensing device (31) and said sensing sensor (16) are connectable to the control system so as to allow the control system to authorize a removal of said workpiece (P) from said machine tool (M) when the pressure of said second hydraulic fluid in said second chamber (30) and the pressure of said pressurized air in said at least one sensing channel (15) are simultaneously higher than their respective threshold values.

3. The apparatus (1) according to claim 1, wherein said at least one hydraulic actuator (22, 23) is of a single acting hydraulic actuator and comprises at least one springback element (35) to displace said clamping unit (3) from said clamping position to said release position.

4. The apparatus (1) according to claim 3, wherein:

said apparatus (1) comprises at least one auxiliary channel (36) located on at least one of either said basic frame (2) or said clamping unit (3), which is configured to be supplied with pressurized air and connectable to an auxiliary sensor (37) adapted to sense the pressure of said pressurized air in said auxiliary channel (36), wherein said auxiliary channel (36) is hermetically sealed when said clamping unit (3) is in the release position and is open outwards when said clamping unit (3) is in said intermediate transient positions;

said first sensing device (27) and said auxiliary sensor (37) are connectable to the control system so as to allow the control system to authorize the picking of said workpiece (P) from said machine tool (M) when the pressure of said first pressurized hydraulic fluid in said first chamber (26) is lower than a respective threshold value and, at the same time, a pressure of said pressurized air in said auxiliary channel (36) is higher than a respective threshold value.

5. The apparatus (1) according to claim 1, wherein said at least one hydraulic actuator (22, 23) comprises a cylinder (22) defining said fixed portion (24) and a stem (23) coming out of said cylinder (22) and defining said movable portion (5).

6. The apparatus (1) according to claim 1, wherein said clamping unit (3) comprises:

at least one bracket element (4) hinged to said movable portion (5) around a first hinging axis (A) and adapted to come into contact with said workpiece (P) in said clamping position;

at least one hinging linkage (6, 7) hinged to said basic frame (2) around a second hinging axis (B) and hinged to said bracket element (4) around a third hinging axis (C);

wherein said hinging axes (A, B, C) are substantially parallel to each other.

7. The apparatus (1) according to claim 6, wherein said hinging linkage (6, 7) comprises a first connecting rod (6) and a second connecting rod (7), both hinged around said second and third hinging axis (B, C).

8. The apparatus (1) according to claim 6, wherein said at least one sensing channel (15) is formed on said basic frame (2), said hinging linkage (6, 7) being shaped to open and close said at least one sensing channel (15) according to a position of said hinging linkage (6, 7).

9. The apparatus (1) according to claim 7, wherein said first connecting rod (6) rests in rotation on a first surface (18) of said basic frame (2) on which said at least one sensing channel (15) emerges and comprises a first venting recess (19), with said first connecting rod (6) being associated first preloading means (20, 21) adapted to keep said first connecting rod (6) in sealed contact on said first surface (18) to keep said first sensing channel (15) closed, an opening of said at least one sensing channel (15) taking place when said first venting recess (19) overlaps with said at least one sensing channel (15).

10. The apparatus (1) according to claim 7, wherein:

said apparatus (1) comprises at least one auxiliary channel (36) located on at least one of either said basic frame (2) or said clamping unit (3), which is configured to be supplied with pressurized air and connectable to an auxiliary sensor (37) adapted to sense a pressure of said pressurized air in said auxiliary channel (36), wherein said auxiliary channel (36) is hermetically sealed when said clamping unit (3) is in the release position and is open outwards when said clamping unit (3) is in said intermediate transient positions;

said first sensing device (27) and said auxiliary sensor (37) are connectable to the control system so as to allow the control system to authorize the picking of said workpiece (P) from said machine tool (M) when the pressure of said first pressurized hydraulic fluid in said first chamber (26) is lower than a respective threshold value and, at the same time, the pressure of said pressurized air in said auxiliary channel (36) is higher than a respective threshold value;

said second connecting rod (7) rests in rotation on a second surface (39) of said basic frame (2) on which said auxiliary channel (36) emerges and comprises a second venting recess (40), with said second connecting rod (7) being associated with a second preloading means adapted to keep said second connecting rod (7) in sealed contact on said second surface (39) to keep said auxiliary channel (36) closed, an opening of said auxiliary channel (36) taking place when said second venting recess (40) overlaps partly with said auxiliary channel (36).

* * * * *